(12) United States Patent
Merz et al.

(10) Patent No.: US 9,543,088 B2
(45) Date of Patent: Jan. 10, 2017

(54) CIRCUIT ARRANGEMENT FOR SUPPRESSING AN ARC OCCURRING OVER A CONTACT GAP OF A SWITCHING MEMBER

(71) Applicant: SMA Solar Technology AG, Niestetal (DE)

(72) Inventors: Christopher Merz, Kassel (DE); Markus Hopf, Espenau (DE)

(73) Assignee: SMA SOLAR TECHNOLOGY AG, Niestetal (DE)

( * ) Notice: Subject to any disclaimer, the term of this patent is extended or adjusted under 35 U.S.C. 154(b) by 286 days.

(21) Appl. No.: 14/302,505

(22) Filed: Jun. 12, 2014

(65) Prior Publication Data

US 2014/0293666 A1     Oct. 2, 2014

Related U.S. Application Data

(63) Continuation of application No. PCT/EP2012/073814, filed on Nov. 28, 2012.

(30) Foreign Application Priority Data

Dec. 19, 2011    (DE) ........................ 10 2011 056 577

(51) Int. Cl.
    *H01H 9/54*         (2006.01)
    *H01H 9/42*         (2006.01)
    (Continued)

(52) U.S. Cl.
    CPC ............... *H01H 9/42* (2013.01); *H01H 9/541* (2013.01); *H01H 33/161* (2013.01); *H02M 1/32* (2013.01);
    (Continued)

(58) Field of Classification Search
    CPC ............ H02M 1/32; H01H 9/42; H01H 9/541; H01H 33/161; H01H 33/596; H01H 2003/163; H02H 3/021; H02H 3/87
    See application file for complete search history.

(56) References Cited

U.S. PATENT DOCUMENTS

| 4,021,699 A | 5/1977 | Runtsch |
| 4,520,419 A | 5/1985 | Locher et al. |

(Continued)

FOREIGN PATENT DOCUMENTS

| DE | 2854623 A1 | 6/1980 |
| DE | 29621154 U1 | 4/1998 |

(Continued)

OTHER PUBLICATIONS

Encyclopedia Electronics, pp. 898-899, Year 1994.

(Continued)

*Primary Examiner* — Matthew Nguyen
(74) *Attorney, Agent, or Firm* — Eschweiler & Associates, LLC

(57) ABSTRACT

The disclosure relates to a circuit arrangement for suppressing an arc occurring during a switching process, wherein a current bypass path comprises a PTC resistor connected in series with a fuse. The current bypass path is provided in parallel with a switch. The disclosure also relates to a photovoltaic power plant with a photovoltaic generator which is connected to an inverter via DC lines. In this arrangement, such a circuit arrangement is arranged in at least one of the DC lines.

19 Claims, 4 Drawing Sheets

(51) Int. Cl.
*H01H 33/16* (2006.01)
*H02M 1/32* (2007.01)
*H02H 3/02* (2006.01)
*H02H 3/087* (2006.01)
*H01H 33/59* (2006.01)

(52) U.S. Cl.
CPC ...... *H01H 33/596* (2013.01); *H01H 2033/163* (2013.01); *H02H 3/021* (2013.01); *H02H 3/087* (2013.01)

(56) References Cited

U.S. PATENT DOCUMENTS

| | | |
|---|---|---|
| 4,583,146 A | 4/1986 | Howell |
| 4,658,320 A * | 4/1987 | Hongel ............... H01H 9/542 361/13 |
| 5,737,160 A | 4/1998 | Duffy |
| 5,805,393 A | 9/1998 | Thomas |
| 5,831,803 A | 11/1998 | Wynn et al. |
| 6,002,559 A | 12/1999 | Meyer |
| 6,201,678 B1 | 3/2001 | Kolbas et al. |
| 6,624,989 B2 * | 9/2003 | Brooks, Jr. ............ H01H 9/542 361/3 |
| 2008/0164961 A1 * | 7/2008 | Premerlani .......... H01H 1/0036 335/7 |
| 2010/0254046 A1 | 10/2010 | Liu et al. |
| 2014/0034613 A1 * | 2/2014 | West .................. H01H 33/14 218/4 |

FOREIGN PATENT DOCUMENTS

| | | |
|---|---|---|
| DE | 102005006953 A1 | 8/2006 |
| DE | 102005061532 A1 | 7/2007 |
| DE | 102008013448 A1 | 5/2009 |
| DE | 102008057874 A1 | 5/2010 |
| EP | 0042113 A2 | 12/1981 |
| EP | 1039611 A2 | 9/2000 |
| EP | 1049238 A2 | 11/2000 |
| EP | 2249393 A1 | 11/2010 |
| FR | 2409594 A1 | 6/1979 |
| GB | 1500765 A | 2/1978 |
| JP | S58164120 | 9/1983 |
| JP | H04317197 A | 11/1992 |
| JP | H04322175 A | 11/1992 |
| JP | H089557 A | 1/1996 |
| WO | 9710636 A2 | 3/1997 |
| WO | 9710637 A1 | 3/1997 |
| WO | 9856095 A2 | 12/1998 |
| WO | 2011034140 A1 | 3/2011 |

OTHER PUBLICATIONS

International Search Report & Written Opinion of the International Searching Authority dated Mar. 4, 2013 for International application No. PCT/EP2012/073814.

* cited by examiner

US 9,543,088 B2

CIRCUIT ARRANGEMENT FOR SUPPRESSING AN ARC OCCURRING OVER A CONTACT GAP OF A SWITCHING MEMBER

REFERENCE TO RELATED APPLICATIONS

This application is a continuation of International application number PCT/EP2012/073814, filed on Nov. 28, 2012, which claims priority to German application number 10 2011 056 577.9, filed on Dec. 19, 2011.

FIELD

The disclosure relates to a circuit arrangement for suppressing an arc occurring during a switching process. In this context, a suppression of an arc is understood to mean either that an occurrence of an arc is prevented or that an arc which has already occurred is extinguished.

BACKGROUND

During the switching of, in particular, direct currents with high current intensity and voltages over about 30 volts, the risk latently exists that during the opening of a contact gap constructed with switching contacts of a switch, an arc forms between the switching contacts via which a current flow is maintained. Such an arc destroys, on the one hand, the switching contacts of the corresponding switch and, on the other hand, involves the risk of a fire.

In order to prevent the risk of fire, special direct-current relays or contactors are known in which an arc that has occurred is conducted away from the switching contacts into special arc extinction chambers. To deflect the arc, magnets interacting with ionized particles of the arc or a stream of compressed air are used in this arrangement. These solutions are mechanically elaborate, on the one hand, and, on the other hand, unsuitable in installations in which no supply of compressed air is available, for example, in photovoltaic power plants.

Furthermore, solutions are known in which an arc is avoided, in that the current is diverted to a current bypass path in parallel to the switching contacts of the switch during the opening of the switch. This current bypass path can be formed by using semiconductor switches, capacitors or temperature-dependent resistors. In this arrangement, capacitors or temperature-dependent resistors in the current bypass path are designed in such a manner or semiconductor switches in the current bypass path are driven in such a manner that when the switch is opened, the current initially flows at least largely via the current bypass path so that voltage and currents are so low when the switch is operated that no arc occurs. After that, the current flow in the current bypass path is reduced, ideally to the value of zero, so that a current flow through the entire arrangement is interrupted.

Such an arrangement using a resistor having a positive temperature coefficient (PTC), also called a PTC resistor in abbreviation in the text which follows, is, for example, known from the printed document EP 0850486 B1. In order to be able to lower the current in the circuit to the value of zero after opening the switch and diversion to the current bypass path formed by the PTC resistor, this arrangement is operated in series with a further switch. The further switch can be opened without problems when the current through the bypass path has dropped to such a small value that, when the further contact gap is operated, an arc no longer occurs or would be extinguished. Both switches are operated simultaneously or at short time intervals from one another, for example by this being a jointly electromagnetically operated switch.

A similar arrangement is known from printed document DE 10 2005 006 953 A1. In a circuit suitable for DC or AC currents, two switches connected in series are provided, wherein a PTC resistor is connected in parallel with a first one of the switches. For interrupting the current in the DC- or AC-circuit arrangement, the first switch with the parallel PTC resistor is opened first. As a result, the current commutates to the current bypass path and flows through the PTC resistor without a switching arc occurring at the contacts of the first switch. Subsequently the PTC resistor heats up, as a result of which its resistance increases and the current in the DC- or AC circuit arrangement decreases. Afterwards, the second switch can as well be opened while the current is already decreased, in order to interrupt the current flow completely without the danger of an arc occurring at this second switch. The PTC resistor and a switching means for the second switch are coupled in such a way, that the second switch is automatically opened, when the PTC resistor expands according to its temperature rise.

However, it is disadvantageous in the arrangements described above that the PTC resistor in the current bypass path is regularly exposed to high loading with each switching process, which is why the arrangement is not suitable for a high number of switching cycles.

From printed document U.S. Pat. No. 4,583,146 it is known to provide a PTC resistor in parallel with a switching gap of a switch and further to provide a voltage dependent resistor (VDR) in parallel with the PTC resistor. After opening the switch and an according increase of the resistance of the PTC resistor, the voltage drop across the switching gap increases and the VDR resistor becomes increasingly conductive, thereby taking over a part of the current flow and unloading the PTC resistor. However, even then there is a possibility that the PTC resistor is not functional anymore after one or more switching cycles and is not able to suppress an arc reliably in a subsequent switching cycle.

In the case of switching members which must be designed for a higher number of switching cycles, alternatively a use of semiconductor switches in the current bypass path has therefore proven to be more suitable in practice, in spite of higher costs. Nevertheless, there is a risk of faults even with such a unit, for example, when the semiconductor switch is defective or the switching contacts are stuck or welded together. For safety reasons, therefore, it is usually required to provide a further circuit arrangement by means of which the circuit can be interrupted, and arcs at this further circuit and/or the first circuit arrangement being suppressed (prevented and/or extinguished).

However, equipping this further circuit arrangement with a semiconductor switch contributes to a further increase in cost for the total arrangement. In addition, there is no simple possibility in such a redundant arrangement of switches bridged with semiconductor switches to detect a failure of only one of the two arrangement parts, since a defect of only one half of the redundant arrangement does not detectably reduce the operability. It is possible, therefore, that the arrangement constructed to be redundant but defective on half its side is continued to be operated although this now increases the risk of the occurrence of an unsuppressed arc.

SUMMARY

In one embodiment a circuit arrangement comprises a PTC resistor for suppressing an arc occurring during a switching process which is constructed as cost-effectively as possible and comprises a reliable indicator for its use so that the risk of the occurrence of an unsuppressed arc due to a non-functional PTC resistor is not increased in a subsequent switching cycle in an undetected manner.

In a circuit arrangement according to the disclosure for suppressing an arc occurring during a switching process, a current bypass path, which has a PTC resistor, is provided in parallel with a switch. The circuit arrangement is distinguished by the fact that a fuse is connected in series with the PTC resistor in the current bypass path.

When the switch of the circuit arrangement is opened under current load, this leads to a current flow in the current bypass path. Since the temperature-dependent resistor is initially at an ambient temperature, its resistance is relatively low due to the positive temperature coefficient of the PTC resistor. Consequently, a relatively high current flows through the fuse which extinguishes or suppresses any arc which may occur over the switch during the opening and then trips the fuse. On the one hand, this protects the switch against an arc burn-off and, on the other hand, the fuse serves as an indicator that the switch has been opened under current load. The circuit arrangement can be used particularly advantageously as an additional protection circuit for a switch that is normally not operated, particularly opened, under current load. Such a situation occurs, for example, in the case of an isolating switch on the direct-current side of a photovoltaic power plant which is usually operated only when first a switch, which is connected in series with the isolating switch and is arc-proof, has been opened.

In advantageous embodiments of the circuit arrangement, a further switch is connected in series with the parallel circuit of the switch and the current bypass path or in the current bypass path itself. The switch and the further switch are, in one embodiment, coupled with respect to their operation. By means of the further switch, a current flow through the current bypass path can be prevented even if it would not drop to zero otherwise due to other elements which may be present in the current bypass path after the tripping of the fuse.

In a further advantageous embodiment of the circuit arrangement, a circuit unit which limits the voltage drop across the fuse when it has tripped is arranged in parallel with the fuse. As a result, a fuse having a low electric strength and thus a small construction size can be used in spite of a high voltage present across the circuit arrangement. Although the circuit unit maintains the current flow in the current bypass path after the fuse has tripped, it rapidly decreases due to the PTC resistor starting to heat up and may possibly be reduced entirely to zero via the aforementioned further switch. In one embodiment the circuit unit preferably comprises at least one diode or two antiparallel-connected diodes. In one embodiment, at least one of the diodes is in this case a Zener diode or a suppressor diode, also known as a Transil diode. In a further embodiment, the element arranged in parallel with the fuse comprises at least one voltage-dependent resistor, for example, a varistor.

In a further advantageous embodiment of the circuit arrangement, an operation of the switch and/or of the further switch is blocked based on a voltage drop across the fuse. It can thereby be achieved that when the fuse is tripped, an operation of the circuit arrangement is prevented. In particular, an automatic or unchecked reactivation of the switch is prevented without the fuse and possibly the PTC resistor of the circuit arrangement having been replaced or checked. This ensures that in one embodiment the circuit in which the circuit arrangement is used is only operated with a correctly operating circuit arrangement.

In one embodiment, a comparator circuit is provided for determining the voltage drop across the fuse or an operating coil for operating the switch, and/or the further switch is connected to the node connecting the fuse and the PTC resistor. In both ways, an operation of the switch and/or of the further switch can be blocked in a simple manner based on the state of the fuse.

In a further advantageous embodiment of the circuit arrangement, a thermal fuse connected thermally to the switch and/or the further switch is connected in series with the operating coil. In this way, the switch and/or the further switch will be opened in the case of overloading of the respective switch or in the case of an arc having occurred.

In a further advantageous embodiment of the circuit arrangement, the fuse and/or the thermal fuse is a reversibly tripping fuse. In this way, it can be achieved that the circuit arrangement can continue to be operated after tripping of the fuse. In this embodiment, a counting device is provided in order to count arc extinction processes which have taken place via the current bypass path. In one embodiment, the counting device blocks resetting of a reversibly tripping fuse when a predefined number of completed arc extinction processes has been reached. Thus, a tripping occurring too frequently, which, for example, could damage the PTC resistor, is also prevented with a reversibly operating fuse.

A photovoltaic power plant according to the disclosure has a photovoltaic generator which is connected to an inverter via DC lines. In this arrangement, one of the circuit arrangements described before is arranged in at least one of the DC lines. This again results in the advantages mentioned in conjunction with the circuit arrangement.

In an advantageous embodiment of the photovoltaic power plant, the switch and/or the further switch is part of a relay for the electrical isolation of the photovoltaic generator from the inverter. In one embodiment an arc-proof switching unit is connected in series with the circuit arrangement. Further, in one embodiment the arc-proof switching unit has a switch which is formed by the switch and/or the further switch of the circuit arrangement. In the constellations mentioned, the circuit arrangement protects switches present in the circuit with little material expenditure from the effects of a (faulty) switching under load.

BRIEF DESCRIPTION OF THE DRAWINGS

In the text which follows, the disclosure will be explained in greater detail with reference to illustrative embodiments, with the aid of six figures in which.

DETAILED DESCRIPTION

Figure 1:
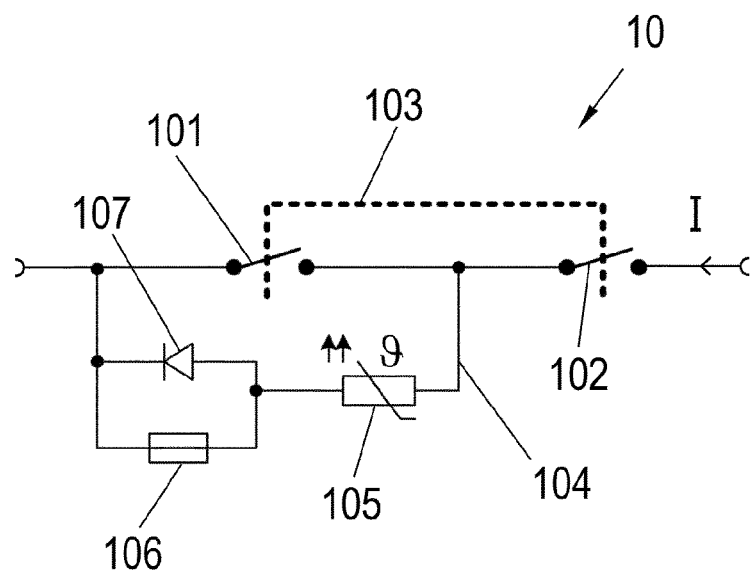
FIG. 1 shows a first illustrative embodiment of a circuit arrangement for suppressing arcs.

FIG. 1 shows a first illustrative embodiment of a circuit arrangement 10 for suppressing arcs. The circuit arrangement 10 has an input terminal and an output terminal which are connected to one another via a series circuit of a switch 101 and a further switch 102. The two switches 101, 102 can be operated jointly coupled to one another via a coupling 103. The circuit arrangement is used, for example, for connecting a current or a voltage source to a load and is therefore connected in series between the current or voltage source and the load (current or voltage source are not shown in FIG. 1). The switches 101 and 102 can be, for example, switches of a jointly electromagnetically operated switching member (contactor), the further components of which, for example, an operating coil, are not shown here. In such a case, the coupling 103 is direct and mechanical. Alternatively, however, the switches 101 and 102 can also be allocated to different switching members, wherein the coupling 103 then comprises driving the two switching members simultaneously or with a slight offset in time. In a particularly advantageous embodiment, the switch 102 opens shortly after the opening of the switch 101. This can be done, for example, by correspondingly electrically driving the switching members. Apart from mechanical and electrical couplings, further coupling mechanisms are possible, for example, an optical coupling of the switches 101, 102, for example, by using photoelements in connection with an electrical drive, or a thermal coupling of the switches 101, 102, for example, via a thermal fuse measuring at the switch 102 and acting on the switch 101, in conjunction with a thermomechanical or electrical drive of the switch. Furthermore, it is conceivable that the switch 101 is also opened via an electrical arc detector, particularly at the switch 102.

In parallel with the contact gap of the switch 101, a current bypass path 104 is arranged which comprises a series circuit of a resistor with positive temperature coefficient 105, called PTC resistor 105 in the text which follows, and a fuse 106. In parallel with the fuse 106, a diode 107 is arranged in such a manner that it is located in the forward direction for a current I flowing through the circuit arrangement 10. A part of the current I flows in the same direction through the current bypass path 104.

To explain the operation of the circuit arrangement 10 according to FIG. 1, an initial situation is assumed in the text which follows in which both switches 101, 102 are closed and a current I possibly flows through the circuit arrangement 10 in the direction specified.

The switches 101, 102 are now opened simultaneously or with a slight offset in time from one another. It is also assumed that a current I still flowing at the time of the opening of the switches 101, 102 already indicates a fault case. Such a fault case may have occurred, for example, due to the fact that an arc-proof switching unit preceding the circuit arrangement 10, not shown in FIG. 1, has failed and could not interrupt the current flow, whether due to stuck contacts or because an arc has formed nevertheless in this switching unit, e.g., due to a defective semiconductor switch. The current flow I through the circuit arrangement 10, still existing in such a fault case, leads to a current flow in the current bypass path 104 when the switch 101 is opened.

Since the temperature-dependent resistor 105 is initially at an ambient temperature, its resistance is relatively low due to the positive temperature coefficient of the PTC resistor 105. Due to the forward voltage, which is within a range of about one volt in the case of typical diodes 107, the current in the current bypass path 104 essentially flows through the fuse 106. The resistance of the PTC resistor 105 with ambient temperature and the tripping current of the fuse 106 are selected in such a manner that the fuse 106 trips. The fuse 106 in one embodiment is an irreversibly tripping fuse, for example a fusible cut-out. After the fuse 106 has tripped, the current flow in the current bypass path 104 is commutated to the diode 107. The resistance value of the PTC resistor 105 is also dimensioned in such a manner that the magnitude of the current flowing initially through the current bypass path 104 after the switching member 101 has opened is sufficiently large, as a result of which the voltage drop across the switch 101 is so small that no arc can form at the switch 101.

Due to the current flow in the current bypass path 104 and the voltage drop across the PTC resistor 105, the latter heats up within a short period of time, as a result of which its resistance value increases and the current through the current bypass path 104 is reduced. Due to the open switch 101, at which no arc was able to form, the current I through the circuit arrangement 10 is also consequently reduced. This in turn leads to the extinction of any arc which may have formed at the further switch 102 or at a switch arranged in series with the circuit arrangement 10.

Due to the irreversible tripping of the fuse 106, it is possible to notice whether or not the circuit arrangement 10 has become active for arc suppression by reading the status of the fuse 106. Thus, once a circuit arrangement 10 has become active, this indicates a fault in an isolating device preceding the circuit arrangement 10 and disconnecting the current I, for example, an arc-proof switching unit. To prevent further damage, it is necessary that, before the current or voltage source is again connected to the load, the cause of the fault is recognized and eliminated. In the circuit arrangement 10, a closing of the switches 101, 102 is only performed in conjunction with an interrogation relating to the status of the fuse 106. During this process, the closing of the switches 101, 102 is enabled only with the fuse intact—not tripped—and is otherwise blocked. In this manner, the connecting of current or voltage source and load in the presence of potentially faulty components can be effectively suppressed. It is only after the cause has been analyzed, the fault has been eliminated and possibly also components damaged due to the fault have been exchanged that the tripped fuse 106 is exchanged for an undamaged fuse. The fault elimination is acknowledged in this manner and the circuit arrangement is released for reconnection of current or voltage source and load.

The diode 107 also ensures that a voltage drop across the fuse 106 is limited to the forward voltage of the diode 107. The fuse 106 thus needs to be designed only for a low maximum voltage, i.e. with a low electric strength, as a result of which the circuit arrangement 10 can be constructed to be compact and cost-effective.

Figure 2:
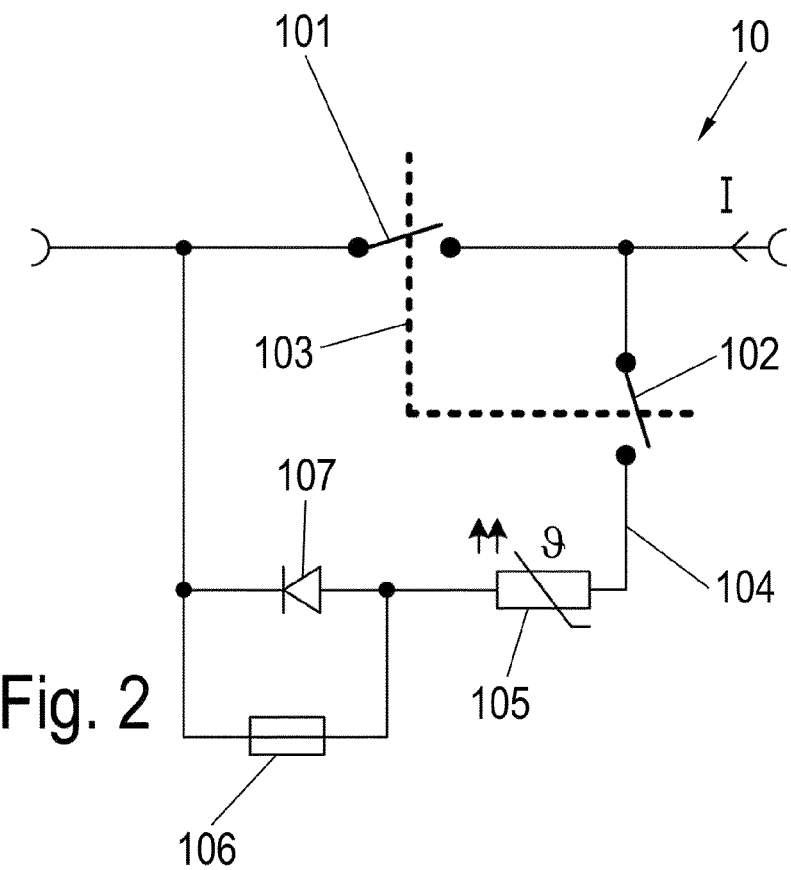
FIG. 2 shows a second illustrative embodiment of a circuit arrangement for suppressing arcs.

FIG. 2 shows a circuit arrangement 10 in a second example embodiment. Identical reference symbols designate identical or identically acting elements in this and in the figures following.

In contrast to the example shown in FIG. 1, the switch 102 is here a component of the current bypass path 104 and is connected there in series with the PTC resistor 105. The switches 101 and 102 are thus arranged here in parallel current paths.

In the operation of the circuit arrangement 10 according to FIG. 2, two different variants are possible as will be explained in the text which follows.

In a first variant, both switches 101, 102 are closed in the initial situation and a current I may flow through the circuit arrangement 10 in the direction specified.

If the connection from input to output is to be interrupted by the circuit arrangement 10, the switch 101 and thereafter the further switch 102 are opened. As described in the example embodiment of FIG. 1, it is to be assumed also in this case that a current I still flowing at the time of opening of the switches 101, 102 already indicates a fault case of an arc-proof switching unit present in the circuit. If a current I still flows through the circuit arrangement 10 at the time of opening of the switch 101, this current I is commutated to the current bypass path 104 which prevents an occurrence of an arc at the switch 101. As explained previously, the fuse 106 trips, on the one hand, and, on the other hand, the current is reduced by a rise in temperature at the PTC resistor 105. The opening of the further switch 102 then interrupts the current flow completely. If at the time of opening of the further switch 102 there should still be a current flow through the current bypass path 104 which is so great that an arc forms at the further switch 102, this would be extinguished by the subsequent (further) heating of the PTC resistor 105.

In a second variant, the switch 101 is closed and the switch 102 is opened in the initial situation. A current I may again flow through the circuit arrangement 10 in the direction specified.

In the second variant, the switch 101 is also opened first when the connection from input to output is to be interrupted. If a current I still flows through the circuit arrangement 10 during the opening, an arc forms, under certain circumstances, at the switch 101. The further switch 102 is then closed in order to divert the current to the current bypass path 104 and to extinguish an arc which may have occurred. Subsequently, the further switch 102 is opened again in order to interrupt the current flow through the circuit arrangement 10 completely after an arc which may have occurred has been extinguished with the aid of the current bypass path 104. Operating the further switch 102 can here be coupled to the occurrence of an arc, for example, by the further switch 102 being designed as a bimetal switch which is thermally connected to the switch 101. If an arc occurs at the switch 101, the further switch 102 closes automatically due to the heat development and opens again when the arc is extinguished. In contrast to FIG. 1, a coupling of the switches 101, 102 is implemented in FIG. 2 in such a manner that a coupling of a thermal or other type measured at the switch 101 and acting on the switch 102 is present.

Figure 3:
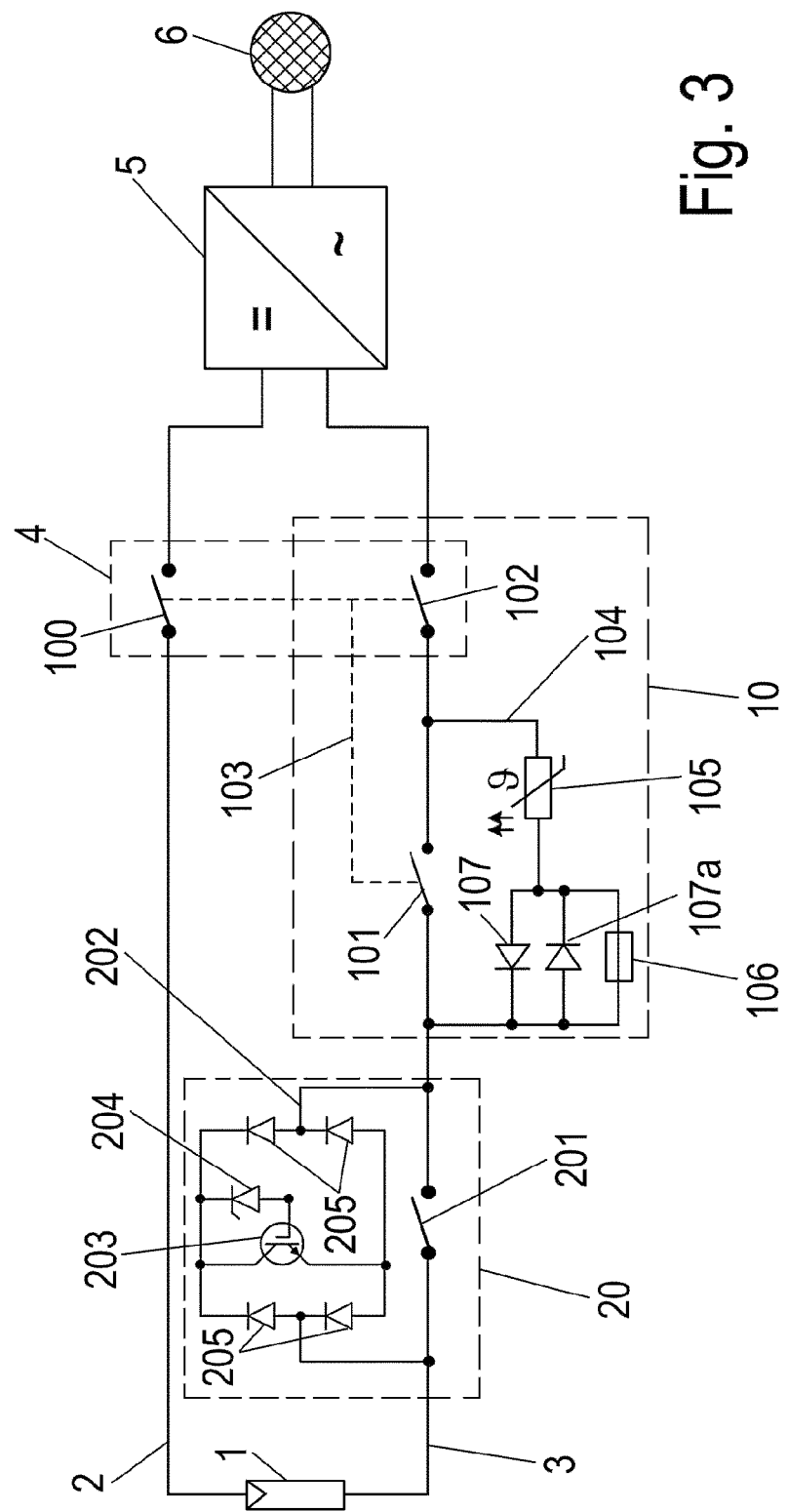
FIG. 3 shows a photovoltaic power plant with a circuit arrangement according to a third illustrative embodiment.

FIG. 3 reproduces the use of a circuit arrangement 10 for suppressing arcs in a further example embodiment within a photovoltaic power plant in a block diagram.

The photovoltaic power plant comprises a photovoltaic generator 1 which is connected to an inverter 5 via direct-current (DC) lines 2, 3 via a relay 4. The inverter 5 is coupled at its output end to a power supply grid 6, wherein the power supply grid 6 can be a public supply grid or a private supply grid (island operation).

By way of example, the photovoltaic generator 1 in FIG. 3 is symbolized by the circuit symbol of a single photovoltaic cell. In an implementation of the photovoltaic power plant shown, the photovoltaic generator 1 can be a single photovoltaic module which has a multiplicity of cells or an interconnection of a number of photovoltaic modules, particularly in a series connection to form a string or to form several strings connected in parallel. Also by way of example, the inverter 5 is designed with only two alternating current outputs for a single-phase feed into the power supply grid 6. Naturally, another one than the single-phase design of the inverter 5 shown is also possible, e.g. a three-phase design.

The relay 4 has here two switches 100, 102 which are in each case arranged in one of the direct-current lines 2, 3. Thus, a complete (electrical) isolation of the photovoltaic generator 1 from the inverter 5 is possible via the relay 4 as is required for safety reasons, for example, in the case of maintenance of the photovoltaic generator 1 and/or of the inverter 5. However, it is also conceivable that only a single-pole isolation between photovoltaic generator 1 and inverter 5 is to take place, wherein either the switches 100 and 102 can then be controlled independently (i.e. without a coupling interconnecting each other as shown in FIG. 3) or the switch 100 of the relay 4 can then be omitted.

In order to be able to switch the relay 4 without hazard, in particular to open the switches 100, 102, an arc-proof switching unit 20 is arranged in one of the direct-current lines 2, 3, here, for example, in the direct-current line 3. The arc-proof switching unit 20 comprises a switch 201 for interrupting the current flow through the DC line 3. In parallel with the switch 201, a current bypass path 202 is provided which has a semiconductor switch 203. The semiconductor switch 203 is here arranged diagonally in a bridge rectifier arrangement consisting of four rectifier diodes 205 and is driven by a driver circuit. The rectifier diodes 205 are used for conducting a current in the current bypass path 202 independently of its current direction in the forward direction through the semiconductor switch 203. A zener diode 204 protects the semiconductor switch 203 against damage in the event of any overvoltages occurring.

Shortly before the opening of the switch 201, the semiconductor switch 203 is then switched to conduct by the driver circuit. In this manner, there is, after the opening of the switch 201, firstly a current flow through the semiconductor switch 203, as a result of which current flows through the current bypass path 202 and an occurrence of an arc at the switch 201 is prevented. This is followed by an opening of the semiconductor switch 203, as a result of which the current flow is interrupted. Thus, the current flow in the DC line 3 and accordingly also in the (DC) line 2 can be interrupted also under load via the arc-proof switching unit 20. Subsequently, an electrical isolation, which cannot take place by the switch 201 due to the current bypass path 202, can take place by operating the relay 4 and especially opening the switches 100 and 102.

Furthermore, an additional switch 101 is provided in the DC line 3 as part of a circuit arrangement 10 according to the application. This comprises also the switch 102 of the relay 4 as further switch. The circuit arrangement 10 is essentially constructed in accordance with the circuit arrangement from FIG. 1. The only difference is that a further diode 107*a*, which allows the circuit arrangement 10 to operate bidirectionally, is arranged antiparallel to the diode 107. Such a bidirectional design, which, in the present example, is also given in the arc-proof switching unit 20, can be appropriate under certain operating conditions in photovoltaic power plants, for example, when return currents occur due to interconnections, asymmetries or ground or short circuits within a string and several strings and circuit arrangements allocated to them are connected in parallel. It is pointed out that both the circuit arrangement 10 and the arc-proof switching unit 20 can also be designed to be unidirectional, however, if a reverse current compared with the normal operation of the photovoltaic power plant is prevented in another way.

In the photovoltaic power plant of FIG. 3, the circuit arrangement 10 is used for protecting the switches 100, 102 and 201 present in the circuit if an interruption of the direct-current circuit preceding the opening of the relay 4 failed due to opening of the switch 201, for example, if, due to a defective semiconductor switch 203, an arc has occurred between the contacts of the switch 201. Similarly, the circuit arrangement 10 protects the switches 100 and 102 present in the circuit if the current flow in the direct-current circuit could not be interrupted due to a defective switch 201, for example, due to stuck contacts of the switch 201, and, therefore, the risk of forming an arc over the switches 100, 102 exists on opening the relay 4. For this purpose, the switch 102 of the circuit arrangement 10 is operated in parallel to switches 100, 101 via the coupling 103. As stated in conjunction with FIG. 1, this can be done again by a direct mechanical coupling, for example in that the switches 100, 101 and 102 are operated by a joint operating coil of the relay 4.

In the example shown, the further switch 102, protected by the switch 101, of the circuit arrangement 10 is allocated to the relay 4. However, an arrangement is also conceivable in which an electrical isolation via the relay 4 is not provided and only the arc-proof switching unit 20 is provided for interrupting the circuit. In such a case, the switch 201 can act as the further switch of the circuit arrangement 10, wherein this switch 201 would then be coupled to the switch 101. In this embodiment, it is especially appropriate that the semiconductor 203 including diodes 204, 205 is connected in parallel with the series circuit of switch 201 and switch 101.

For reasons of fault tolerance, it may be of advantage to replace, apart from the switch 102 already protected, also other switches, particularly switches 201, 100, by the circuit arrangement 10.

Figure 4:
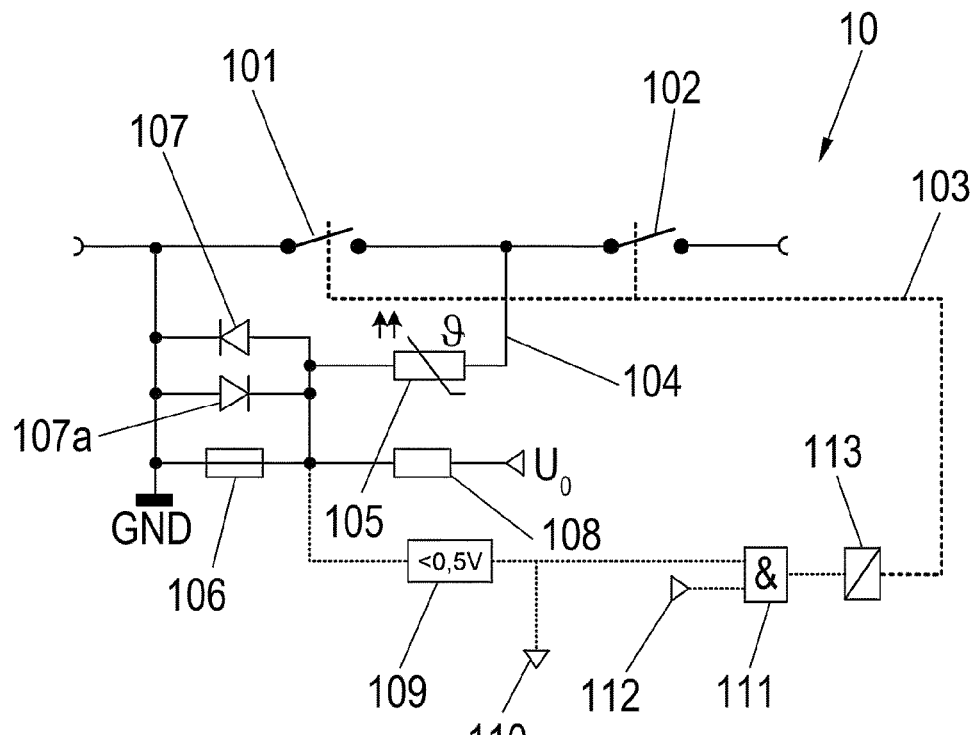
FIGS. 4 to 6 show further illustrative embodiments of circuit arrangements for suppressing arcs.

FIG. 4 shows a further example embodiment of a circuit arrangement 10 for suppressing an arc. The example embodiment reproduced in FIG. 4 is based on the circuit arrangement 10 reproduced in FIG. 1, in a bidirectional design to which reference is hereby made.

In addition to the elements known from the previous example embodiments, a device is provided here by means of which the status of the fuse 106 is monitored and which reacts to the operation of the switches 101 and 102. For this purpose, one end of the fuse 106 is connected to a ground terminal GND as a reference potential. The other end of the fuse 106 is connected via a resistor 108 to a voltage source which is designated by a voltage $U_0$ in FIG. 4. The end of the fuse 106 not located at the ground potential GND is also connected to an input of a comparator circuit 109 which measures the voltage at this input and compares the voltage or its absolute value with a threshold value of about 0.5 volt. More generally stated, the threshold value is defined in one embodiment such that it is located within the interval defined by zero volt and the forward voltage of the diode. To the input of the comparator circuit 109, the voltage drop across the parallel circuit of the fuse 106 and the diodes 107, 107a is therefore applied. In the case of a working, untripped fuse 106, this voltage drop essentially tends to be zero volts due to the low internal resistance of the fuse 106. If, in contrast, the fuse 106 has tripped, for example, if it is thus burnt through when using a fusible cut-out as fuse 106, the current in the current bypass path 104 flows via the diode 107, whereupon a voltage drop of about 0.7 to 1 volt occurs depending on the type of the diode 107. In the case of an untripped fuse 106, the voltage drop is thus below the threshold value of the comparator circuit 109, whereas it is above this threshold value with a tripped fuse 106.

At the output of the comparator circuit 109, a digital signal is output which reproduces the two possible states of the fuse 106. The signal at the output of the comparator circuit 109 can be supplied via a signal output 110, for example, to a signal device which thus indicates a tripping of the fuse 106. Furthermore, the signal at the output of the comparator circuit 109 is supplied to an input of an AND gate 111. A further input of the AND gate is connected to a control input 112. Via the output of the AND gate 111, an operating coil 113 is driven which operates the switches 101 and 102 via the coupling 103. The operating coil 113, the coupling 103 and the switches 101 and 102 thus form a switching member, for example a contactor or relay. Thus, the switches 101 and 102 can be operated via the control input 112 of the circuit arrangement 10, but this only with a working fuse 106. If, in contrast, the fuse 106 has tripped once because the circuit arrangement 10 has become active for arc suppression, the switches 101 and 102 can correspondingly not be switched on again without first replacing the fuse 106. After a defect, it is thus no longer possible to build up a current flow and therefore it is also no longer possible to ignite an arc.

It can also be provided in one embodiment that, due to certain constructional details, a replacement of the fuse 106 is only possible together with an exchange of the PTC resistor 105 in order to prevent the circuit arrangement from being operated further with a PTC resistor 105 possibly damaged by the tripping process. It is also conceivable to use a counting device in one embodiment in conjunction with a reversibly operating fuse 106. The counting device in conjunction with such a reversibly operating fuse 106 here offers an extended functionality in comparison with the embodiments previously shown. It is thus known that, especially in the case of polymer-based PTCs (so-called PPTCs), each arc extinction causes irreversible function-damaging effects in the component. For this reason, a PPTC can only reliably perform a limited number of arc extinction processes. After the released number of arc extinctions, the PPTC must be exchanged for reasons of safety. Analogously to the irreversible fuse, the reversibly tripping fuse 106 also blocks a reconnection of current or voltage source to the load without the fault elimination first having been acknowledged by resetting the fuse 106. However, each successful arc extinction via the circuit arrangement 10 is not mandatorily linked to a physical exchange of the fuse 106 which can be more cost-effective in the relatively long term. The counting device counts the processes of arc extinction performed via the PTC resistor 105 and, after reaching a predefined number characteristic of the material of the respective PTC resistor, blocks any resetting of the reversible fuse 106. It is only after the PTC resistor, no longer operating reliably, has been replaced by a new component and the completed exchange has been acknowledged at the counting device that the blocking for resetting the reversibly operating fuse 106 is canceled and the circuit arrangement 10 is released for reconnecting the current or voltage source to the load. With the acknowledgement at the counting device, its counting mechanism is suitably reset to the starting value 0, for example.

Figure 5:
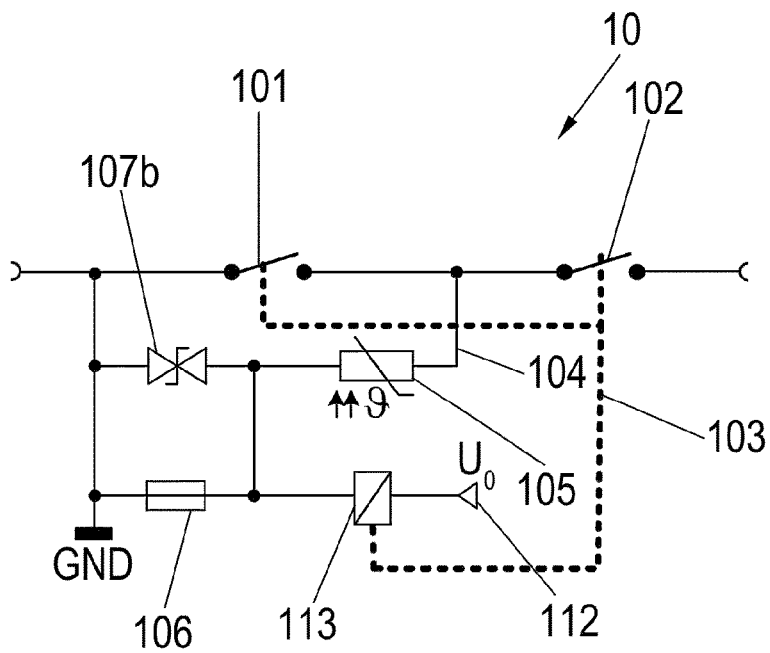

FIG. 5 shows a circuit arrangement 10 in a further example embodiment. Reference is again made to the previous example embodiments with regard to the fundamental structure. Instead of the diodes 107 or 107a, a bidirectional suppressor diode 107b, also known as a bidirectional Transil diode, is provided in this example embodiment. In the case of a unidirectional design of the circuit arrangement 10, a Zener diode or a unidirectional suppressor diode, also known as a unidirectional Transil diode, can also be used as diode 107b at this point. As an alternative to the at least one diode 107, 107a, 107b connected in parallel with the fuse 106, another component for generating a desired voltage drop can also be connected in parallel with the fuse 106. Such a component can be, for example, a resistor or a voltage-dependent resistor (varistor). A combination of several components for generating the desired voltage drop, for example, a parallel connection of a diode and a resistor, is also conceivable.

In this illustrative embodiment, the operating coil 113 of the switching member, to which the switches 101 and 102 belong, is connected directly to the node between PTC resistor 105 and fuse 106. By means of the suppressor or Zener diode 107b, a functionality as in the illustrative embodiment of FIG. 4 is achieved. In the case of a working fuse 106 and an applied control voltage of magnitude $U_0$ at the control input 112, the entire voltage $U_0$ essentially drops across the operating coil 113, whereupon the latter operates the switches 101 and 102. The Transil, suppressor or Zener diode 107b now has a breakdown voltage which is so high that, when the fuse 106 is tripped, the voltage drop across the Transil, suppressor or Zener diode 107b reduces the voltage drop across the operating coil 113 in such a manner that the operating coil 113 no longer operates the switches 101 and 102. The fuse 106 must be designed, therefore, in such a manner that it does not yet trip at the current necessary for the operating coil 113, but trips at the lowest-possible arc-generating current.

Figure 6:
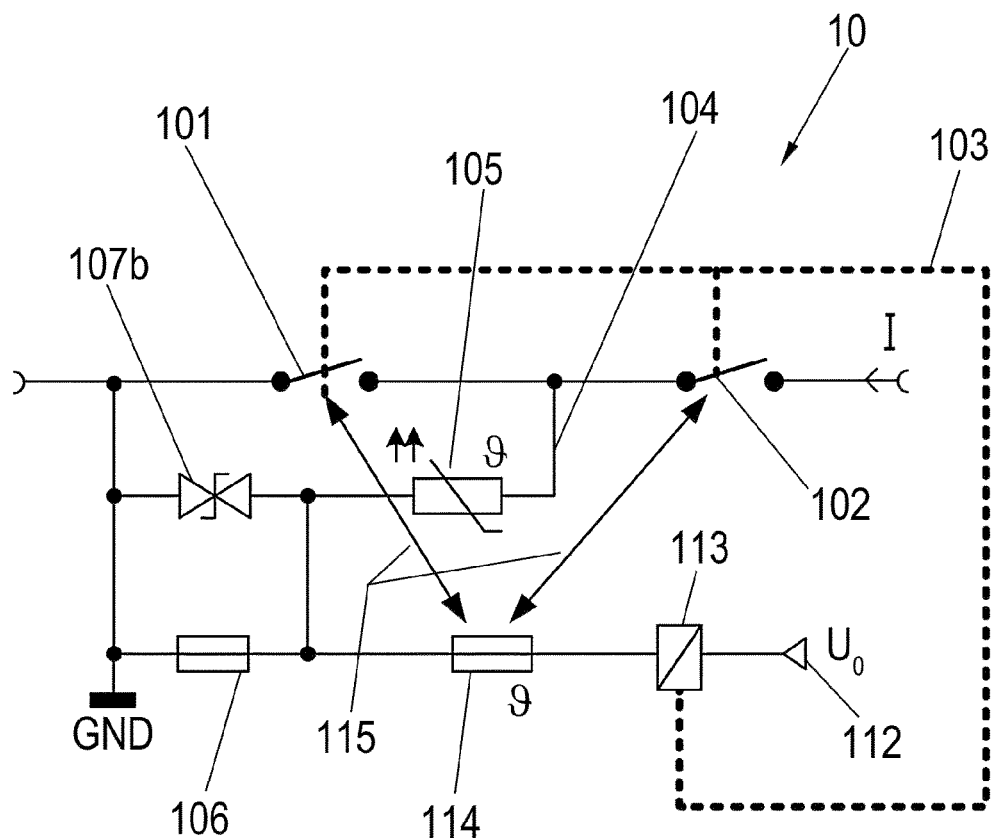

FIG. 6 shows a further development of the circuit arrangement 10 from FIG. 5. In the illustrative embodiment of FIG. 6, a thermal fuse 114, for example a manually resettable, a self-resetting or a nonresettable thermal fuse, is arranged in series with the operating coil 113. This thermal fuse 114 is in thermal contact with the switches 101 and 102 which is symbolized by interacting arrows 115 in FIG. 6.

If contact problems, which can lead to a contact burning, occur in the switches 101, 102, they are detected by the thermal fuse 114, whereupon the thermal fuse 114 trips and interrupts the current flow through the operating coil 113. Correspondingly, the switches 101 and 102 are opened and any arc occurring—for example over the switch 102—is extinguished via the PTC resistor 105. Furthermore, the fuse 106 is tripped in this case and prevents the switches 101, 102 from closing again, especially also in the case where the thermal fuse 114 is a self-resetting thermal fuse.

The invention claimed is:

1. A circuit arrangement for suppressing an arc occurring during a switching process, comprising:
    a current bypass path comprising a positive temperature coefficient (PTC) resistor and a fuse connected together in series;
    a switch connected in parallel with the current bypass path; and
    a circuit unit configured to limit a voltage drop across the fuse when the fuse has tripped, wherein the circuit unit is arranged in parallel with the fuse.

2. The circuit arrangement as claimed in claim 1, further comprising a further switch connected in series with the parallel circuit of the switch and the current bypass path.

3. The circuit arrangement as claimed in claim 1, further comprising a further switch arranged in the current bypass path.

4. The circuit arrangement as claimed in claim 2, wherein the switch and the further switch are coupled with respect to their operation.

5. The circuit arrangement as claimed in claim 1, wherein the circuit unit arranged in parallel with the fuse comprises at least one diode.

6. The circuit arrangement as claimed in claim 5, wherein the circuit unit arranged in parallel with the fuse comprises two antiparallel-connected diodes.

7. The circuit arrangement as claimed in claim 5, wherein at least one of the diodes is a zener diode or a suppressor diode.

8. The circuit arrangement as claimed in claim 1, wherein the circuit unit arranged in parallel with the fuse comprises at least one voltage-dependent resistor.

9. The circuit arrangement as claimed in claim 1, wherein an operation of the switch and/or an operation of the further switch is selectively blocked based on the voltage drop across the fuse.

10. The circuit arrangement as claimed in claim 9, further comprising a comparator circuit configured to determine the voltage drop across the fuse and provide an output indicative of whether the voltage drop is greater than or less than a predetermined threshold.

11. The circuit arrangement as claimed in claim 9, further comprising an operating coil configured to operate the switch and/or the further switch, wherein the operating coil is connected to a node connecting the fuse and the PTC resistor.

12. The circuit arrangement as claimed in claim 11, further comprising a thermal fuse connected thermally to the switch and/or the further switch, wherein the thermal fuse is connected in series with the operating coil.

13. The circuit arrangement as claimed in claim 12, wherein the fuse and/or the thermal fuse is a reversibly tripping fuse.

14. The circuit arrangement as claimed in claim 13, further comprising a counting device configured to count arc extinction processes which have taken place via the current bypass path.

15. The circuit arrangement as claimed in claim 14, wherein the counting device blocks a resetting of the reversibly tripping fuse when a predefined number of completed arc extinction processes has been reached.

16. A photovoltaic power plant having a photovoltaic generator, comprising:
    an inverter comprising two input DC lines configured to couple to the photovoltaic generator; and
    a circuit arrangement arranged in at least one of the DC lines, the circuit arrangement comprising:
        a current bypass path comprising a positive temperature coefficient (PTC) resistor and a fuse connected together in series;
        a switch connected in parallel with the current bypass path; and
        a circuit unit configured to limit a voltage drop across the fuse when the fuse has tripped, wherein the circuit unit is arranged in parallel with the fuse.

17. The photovoltaic power plant as claimed in claim 16, wherein the switch and/or the further switch is part of a relay for the electrical isolation of the photovoltaic generator from the inverter.

18. The photovoltaic power plant as claimed in claim 16, further comprising an arc-proof switching unit connected in series with the circuit arrangement.

19. The photovoltaic power plant as claimed in claim 18, wherein the arc-proof switching unit has a switch which is formed by the switch and/or the further switch of the circuit arrangement.

* * * * *